United States Patent
Anderson (12)

(10) Patent No.: US 8,544,396 B1
(45) Date of Patent: Oct. 1, 2013

(54) SEED DISPERSING ASSEMBLY

(76) Inventor: Kory Anderson, Aberdeen, SD (US)

( * ) Notice: Subject to any disclaimer, the term of this patent is extended or adjusted under 35 U.S.C. 154(b) by 215 days.

(21) Appl. No.: 13/040,651

(22) Filed: Mar. 4, 2011

(51) Int. Cl.
A01C 5/00 (2006.01)

(52) U.S. Cl.
USPC .......................................................... 111/152

(58) Field of Classification Search
USPC ................... 111/73, 124, 152, 174, 175, 187, 111/188
See application file for complete search history.

(56) References Cited

U.S. PATENT DOCUMENTS

| 2,913,086 | A | * | 11/1959 | Wade | 193/9 |
|---|---|---|---|---|---|
| 4,373,455 | A | | 2/1983 | Friggstad | |
| 4,446,801 | A | | 5/1984 | Machnee et al. | |
| 4,653,412 | A | * | 3/1987 | Clarke | 111/150 |
| 4,669,922 | A | | 6/1987 | Hooper et al. | |
| 4,770,112 | A | | 9/1988 | Neumeyer | |
| 5,033,398 | A | | 7/1991 | Froc | |
| 5,161,472 | A | * | 11/1992 | Handy | 111/73 |
| 5,333,559 | A | * | 8/1994 | Hodapp et al. | 111/152 |
| 5,425,318 | A | | 6/1995 | Keeton | |
| 6,178,901 | B1 | | 1/2001 | Anderson | |
| 6,405,665 | B1 | | 6/2002 | Henry et al. | |
| 6,952,998 | B1 | | 10/2005 | Summach et al. | |
| 7,055,619 | B2 | | 6/2006 | Linnebur et al. | |
| 7,107,917 | B2 | | 9/2006 | Summach et al. | |
| 7,146,917 | B2 | | 12/2006 | Summach et al. | |
| 7,156,028 | B2 | | 1/2007 | Summach et al. | |
| 7,213,524 | B2 | | 5/2007 | Summach et al. | |
| 7,240,624 | B2 | | 7/2007 | Summach et al. | |
| 7,290,491 | B2 | | 11/2007 | Summach et al. | |
| 7,341,008 | B2 | | 3/2008 | Summach et al. | |
| 2002/0069801 | A1 | | 6/2002 | Cruson | |
| 2005/0072345 | A1 | | 4/2005 | Steinlage et al. | |
| 2009/0308296 | A1 | | 12/2009 | Senchuk | |

* cited by examiner

Primary Examiner — Alicia Torres

(57) ABSTRACT

A seed dispersing assembly includes a housing configured to receive and disperse seeds. The housing includes a seed wing and a sealer plate attached together. The sealer plate has a top side, a bottom side, a front edge, a back edge, a first side edge and a second side edge. The seed wing has an upper surface, a lower surface, forward edge, a rearward edge, a first lateral edge and a second lateral edge. The seed wing is abutted against and coupled to a seeding apparatus. The housing has a lumen therein that is in fluid communication with a seed inlet tube of the seeding apparatus. The sealer plate is attached to the lower surface. The seed wing and the sealer plate form a pair of ejection ports of the lumen at a juncture of the rearward edge and the back edge to eject seeds received by the lumen.

17 Claims, 5 Drawing Sheets

SEED DISPERSING ASSEMBLY

BACKGROUND OF THE DISCLOSURE

Field of the Disclosure

The disclosure relates to seed spreading devices and more particularly pertains to a new seed spreading device for evenly dispersing seeds and sealing a furrow over fertilizers deposited into the furrow.

SUMMARY OF THE DISCLOSURE

An embodiment of the disclosure meets the needs presented above by generally comprising a housing configured to receive and disperse seeds. The housing is configured to be attached to a bottom of a seeding apparatus. The housing includes a seed wing and a sealer plate attached together. The seed wing defines an upper wall of the housing and the sealer plate defines a bottom wall. The sealer plate has a top side, a bottom side, a front edge, a back edge, a first side edge and a second side edge. The seed wing has an upper surface, a lower surface, forward edge, a rearward edge, a first lateral edge and a second lateral edge. The seed wing is configured to be abutted against and coupled to the seeding apparatus. The housing has a lumen therein that is in fluid communication with a seed inlet tube of the seeding apparatus. The sealer plate is attached to the lower surface of the seed wing. The seed wing and the sealer plate form a pair of ejection ports of the lumen at a juncture of the rearward edge and the back edge. The ejection ports are positioned rearward of a blade of the seeding apparatus to eject the seeds rearwardly and laterally of the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
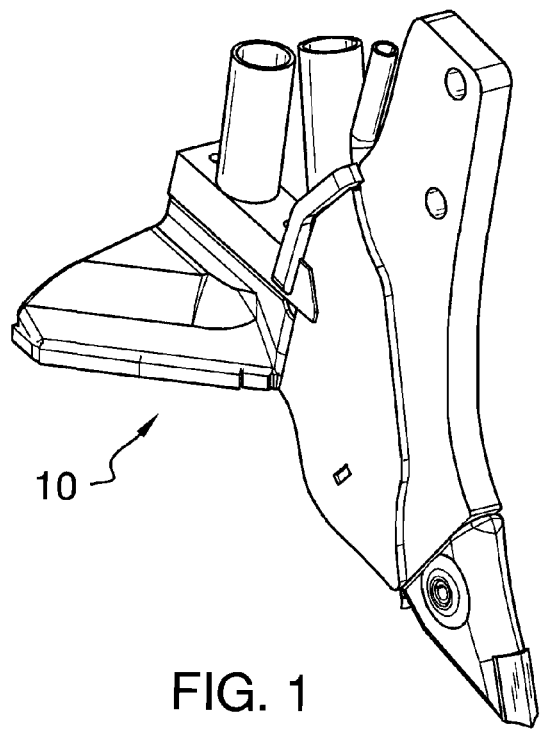
FIG. 1 is a front perspective view of a seed dispersing assembly according to an embodiment of the disclosure.

With reference now to the drawings, and in particular to FIGS. 1 through 7 thereof, a new seed spreading device embodying the principles and concepts of an embodiment of the disclosure and generally designated by the reference numeral 10 will be described.

As best illustrated in FIGS. 1 through 7, the seed dispersing assembly 10 generally comprises a housing 12 configured to receive and disperse seeds 70. The housing 12 is configured to be attached to a bottom of a seeding apparatus 14, conventionally known as a furrow opener. The seeding apparatus 14 includes a main body 16 having a front having a blade attachment 18 attached thereto configured to be extended into soil. The blade attachment 18 may comprise a carbide insert 20 that is replaceable as needed. The main body 16 has a plurality of inlets and may include pair of fertilizer inlets 22 and a seed inlet tube 24. The main body 16 and inlets 22, 24 are conventional to a seeding apparatus. However, the blade attachment 18 allows for quick replacement of an item of the seeding apparatus 14 which routinely becomes dull. The blade attachment 18 includes a female mount 26 which receives a male mount 28 attached to the main body 16. A fastener 30 extends through the female 26 and male 28 mounts. The carbide insert 20 is affixed to the female mount 26. On either side of the main body 14 is one of a pair of air seeder closing discs 32 that are conventional and configured to close the furrow.

The housing 12 includes a seed wing 34 and a sealer plate 36 attached together. The seed wing 34 defines an upper wall of the housing 12 and the sealer plate 36 defines a bottom wall. The sealer plate 36 has a top side 38, a bottom side 39, a front edge 40, a back edge 41, a first side edge 42 and a second side edge 43. The seed wing 34 has an upper surface 44, a lower surface 45, forward edge 46, a rearward edge 47, a first lateral edge 48 and a second lateral edge 49. The edges 46-49 of the seed wing 34 are generally aligned with corresponding ones of the edges 40-43 of the sealer plate 36. The seed wing 34 is configured to be abutted against and coupled to the seeding apparatus 14. In particular, one or more fasteners 50 extend through each of the seeding wing 34 and sealer plate 36 and into a bottom rear side of the main body 16.

Figure 2:
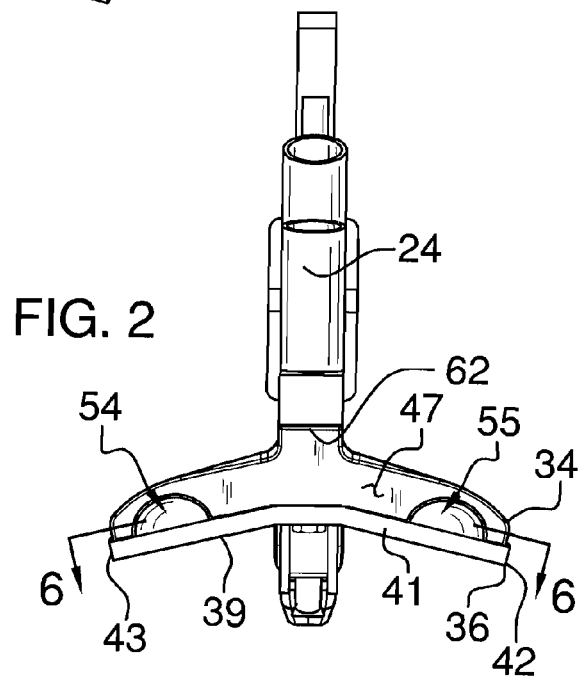
FIG. 2 is a rear view of an embodiment of the disclosure.
Figure 3:
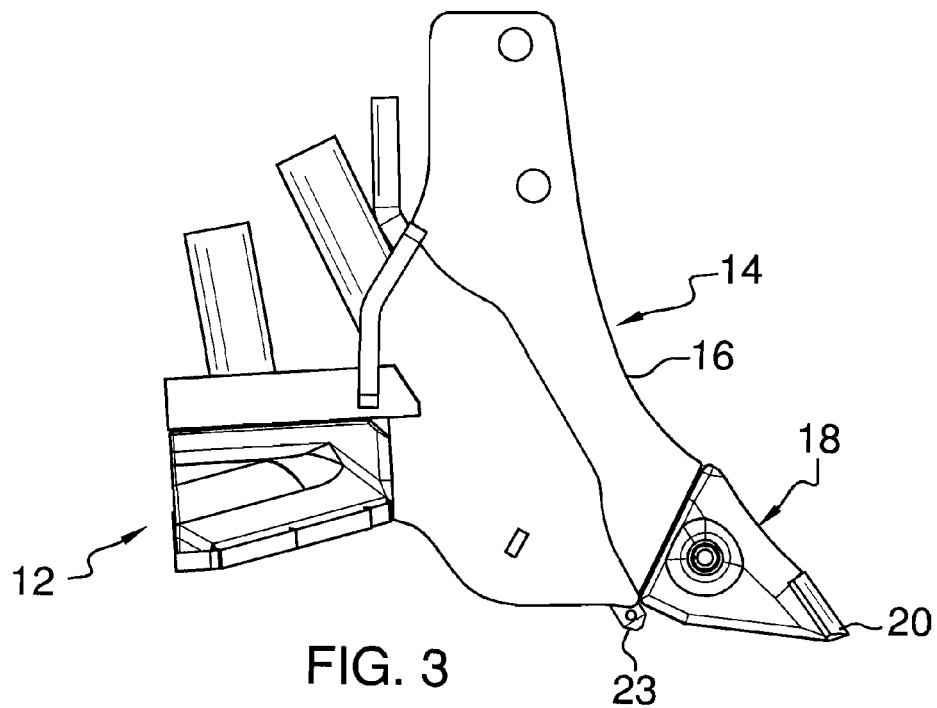
FIG. 3 is a side view of an embodiment of the disclosure.
Figure 4:
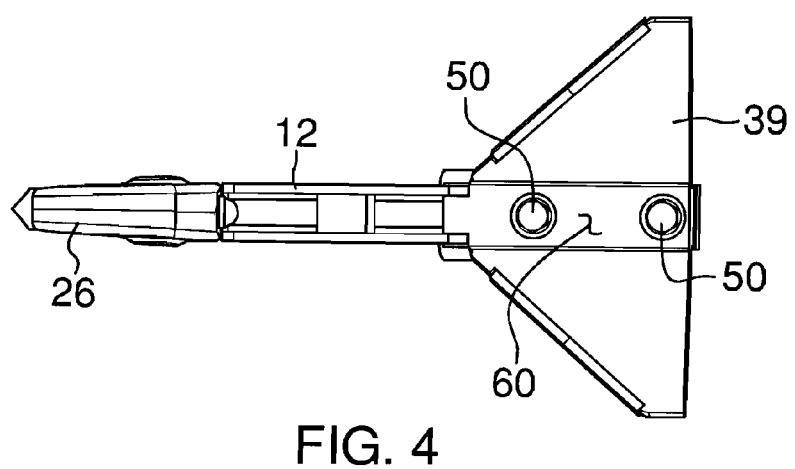
FIG. 4 is a bottom view of an embodiment of the disclosure.
Figure 5:
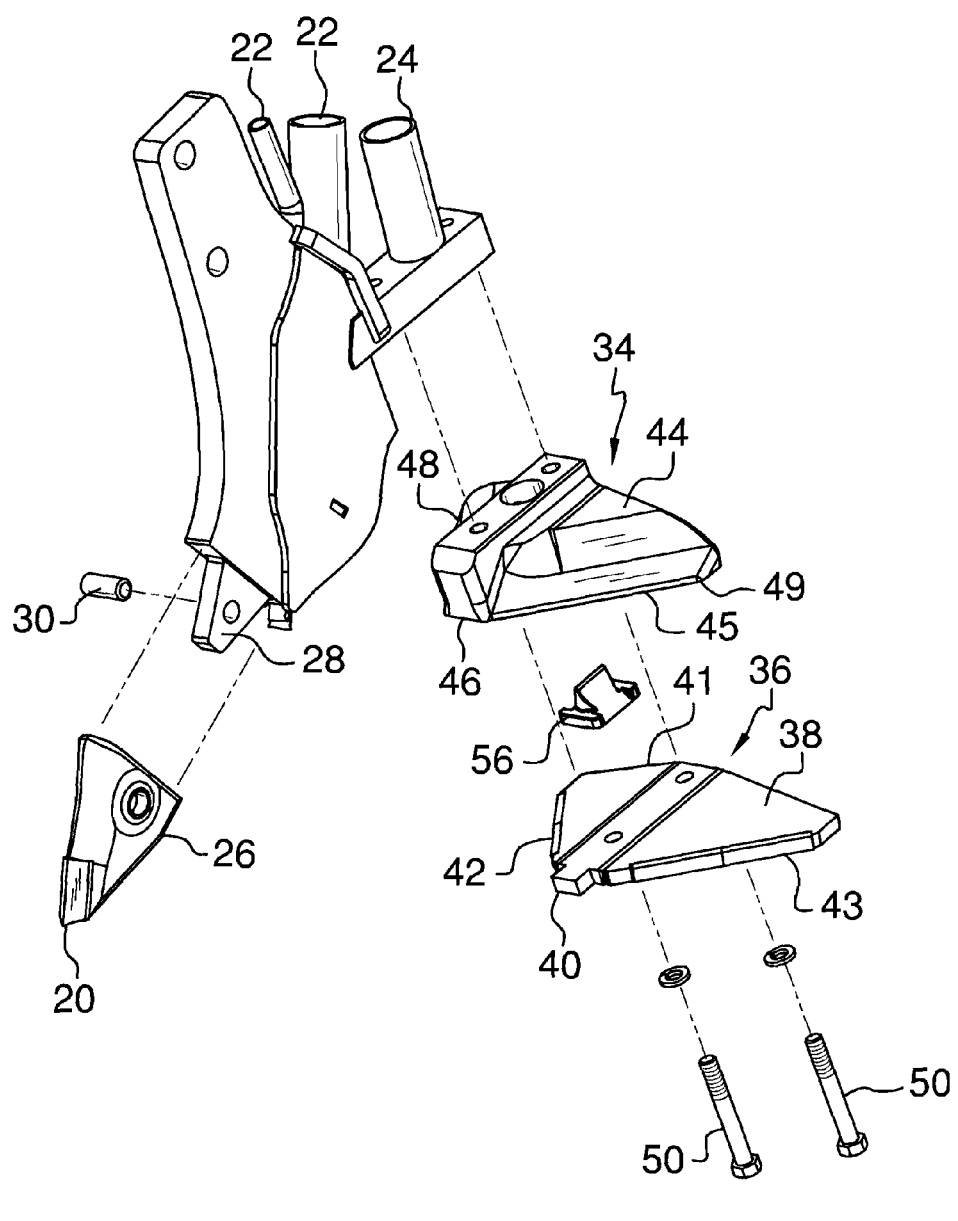
FIG. 5 is an exploded perspective view of an embodiment of the disclosure.
Figure 6:
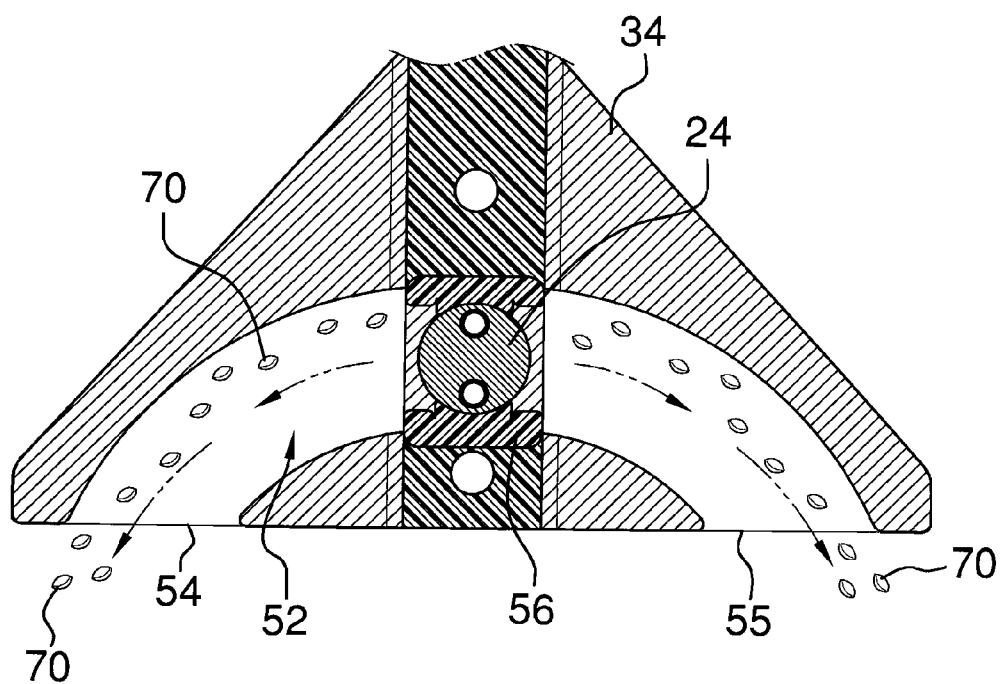
FIG. 6 is a cross-sectional view of an embodiment of the disclosure taken along line 6-6 of FIG. 2.
Figure 7:
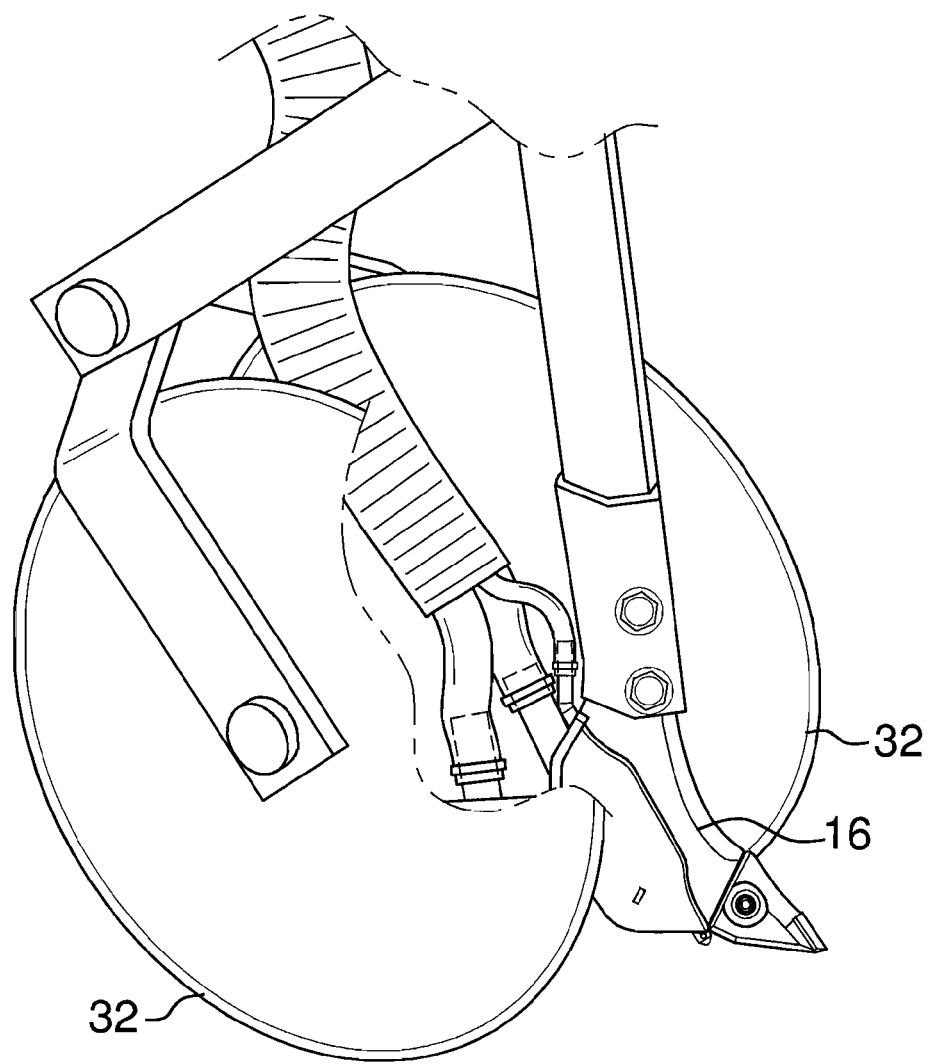
FIG. 7 is a perspective side view of an embodiment of the disclosure.

The housing 12 has a lumen 52 therein that is in fluid communication with the seed inlet tube 24 of the seeding apparatus 14. The sealer plate 36 is attached to the lower surface 45 of the seed wing 34. The seed wing 34 and the sealer plate 36 form a pair of ejection ports of 54, 55 the lumen 52 at a juncture of the rearward edge 47 and the back edge 41, as can be seen in FIG. 2. As such, the ejection ports 54, 55 are above the sealer plate 36 and are positioned rearward of the blade, or blade attachment 18, of the seeding apparatus 14. The ejection ports 54, 55 are spaced laterally from each other. The lumen 52 is arcuate and each of the ejection ports 54, 55 is angled away from a dividing line extending through the forward 46 and rearward 47 edges to disperse seeds rearwardly and laterally away from the housing 12. As can be seen in FIG. 6, this shape throws the seeds 70 outwardly in a more controlled fashion so that they will abut the edges of the furrow and form straighter lines of plants. A splitting insert 56 is mounted between the sealer plate 36 and the seed wing 34. The splitting insert 56 is positioned between the ejection ports 54, 55 and divides seeds 70 from the seed inlet tube 24 between the pair of ejection ports 54, 55 to prevent all or a majority of the seeds 70 to be ejected from only one of the ports 54, 55.

The seed wing 34 and the sealer plate 36 may each be frustum shaped such that the first 48 and second 49 lateral edges of the seed wing 34 are angled away from each other from the forward edge 46 to the rearward edge 47 and the first 42 and second 43 side edges are angled away from each other from the front edge 40 to the back edge 41. The sealer plate 36 has a central area 60 extending from the front edge 40 to the back edge 41. The bottom side 39 is angled downwardly from the central area 60 to each of the first 42 and second 43 side edges. In particular, this structure places a juncture of the back edge 41 and the first side edge 42 and a juncture of the back edge 41 and second side edge 43 in a horizontal plane that lies below a horizontal plane intersecting the front edge 40.

The seed wing 34 has a middle section 62 extending from the forward edge 46 to the rearward edge 47. The upper surface 44 is angled downwardly from the middle section 62 to each of the first 48 and second 49 lateral edges. The upper surface 44 is angled upwardly from the forward edge 46 to the rearward edge 47. This shape allows for the lumen 52 to be positioned where needed as well as throwing soil laterally away from the main body 16. The seed wing 34 may be comprised of a plastic material. It has been found that a plastic material, when used, tends to prevent the accumulation of soil on the seed wing 34. However, it should be noted that particularly hard soils may require the use of metallic materials to prevent damage to the seed wing 34.

In use, the assembly 10 would typically be one of a plurality of assemblies 10 attached to a seed and fertilizing implement. As the main body 16 is pushed forward, the blade attachment 18 opens the soil which is then spread open by the housing 12. The fertilizer tubes 22 deposit fertilizers into the furrow created by the blade attachment 18 while the housing 12 deposits seeds 70 as described above. The unique shape of the sealing plate 36 pulls soil inward over a central portion of the furrow to seal in fertilizers and in particular gaseous or liquid fertilizers injected into the soil by an injection tube 23.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A seed dispersing assembly configured for attachment to a seeding apparatus configured to open a furrow and deposit seeds into the furrow, said assembly comprising:
    a housing configured to receive and disperse seeds, said housing being configured to be attached to a bottom of the seeding apparatus, said housing including a seed wing and a sealer plate attached together, said seed wing defining an upper wall of said housing and said sealer plate defining a bottom wall;
    said sealer plate having a top side, a bottom side, a front edge, a back edge, a first side edge and a second side edge; and
    said seed wing having an upper surface, a lower surface, forward edge, a rearward edge, a first lateral edge and a second lateral edge, said seed wing being configured to be abutted against and coupled to the seeding apparatus, said housing having a lumen therein being in fluid communication with a seed inlet tube of the seeding apparatus, said sealer plate being attached to said lower surface of said seed wing, said seed wing and said sealer plate forming a pair of ejection ports of said lumen at a juncture of said rearward edge and said back edge, said ejection ports being positioned rearward of a blade of the seeding apparatus, said seed wing and said sealer plate each being frustum shaped such that said first and second lateral edges of said seed wing are angled away from each other from said forward edge to said rearward edge and said first and second side edges are angled away from each other from said front edge to said back edge, said seed wing has a middle section extending from said forward edge to said rearward edge, said upper surface being angled downwardly from said middle section to each of said first and second lateral edges.

2. The assembly according to claim 1, wherein said ejection ports are spaced from each other, said lumen being arcuate and each of said ejection ports being angled away from a dividing line extending through said forward and rearward edges to disperse seeds rearwardly and laterally away from said housing.

3. The assembly according to claim 1, further including a splitting insert being mounted between said sealer plate and said seed wing, said splitting insert being positioned between said ejection ports and dividing seeds from the seed inlet tube between said pair of ejection ports.

4. The assembly according to claim 1, wherein said sealer plate has a central area extending from said front edge to said back edge, said bottom side being angled downwardly from said central area to each of said first and second side edges.

5. The assembly according to claim 1, wherein said sealer plate has a central area extending from said front edge to said back edge, said bottom side being angled downwardly from said central area to each of said first and second side edges.

6. The assembly according to claim 1, wherein said seed wing is comprised of a plastic material.

7. The assembly according to claim 1, wherein said upper surface is angled upwardly from said forward edge to said rearward edge.

8. A seed dispersing assembly configured for attachment to a seeding apparatus configured to open a furrow and deposit seeds into the furrow, said assembly comprising:
    a housing configured to receive and disperse seeds, said housing being configured to be attached to a bottom of the seeding apparatus, said housing including a seed wing and a sealer plate attached together, said seed wing defining an upper wall of said housing and said sealer plate defining a bottom wall;
    said sealer plate having a top side, a bottom side, a front edge, a back edge, a first side edge and a second side edge;
    said seed wing having an upper surface, a lower surface, forward edge, a rearward edge, a first lateral edge and a second lateral edge, said seed wing being configured to be abutted against and coupled to the seeding apparatus, said housing having a lumen therein being in fluid communication with a seed inlet tube of the seeding apparatus, said sealer plate being attached to said lower surface of said seed wing, said seed wing and said sealer plate forming a pair of ejection ports of said lumen at a juncture of said rearward edge and said back edge, said ejection ports being positioned rearward of a blade of the seeding apparatus, said ejection ports being spaced from each other, said lumen being arcuate and each of said ejection ports being angled away from a dividing line extending through said forward and rearward edges to disperse seeds rearwardly and laterally away from said housing;

said seed wing and said sealer plate each being frustum shaped such that said first and second lateral edges of said seed wing are angled away from each other from said forward edge to said rearward edge and said first and second side edges are angled away from each other from said front edge to said back edge;

a splitting insert being mounted between said sealer plate and said seed wing, said splitting insert being positioned between said ejection ports and dividing seeds from the seed inlet tube between said pair of ejection ports;

said sealer plate having a central area extending from said front edge to said back edge, said bottom side being angled downwardly from said central area to each of said first and second side edges;

said seed wing having a middle section extending from said forward edge to said rearward edge, said upper surface being angled downwardly from said middle section to each of said first and second lateral edges, said upper surface being angled upwardly from said forward edge to said rearward edge; and said seed wing being comprised of a plastic material.

9. A seed dispersing assembly configured for attachment to a seeding apparatus configured to open a furrow and deposit seeds into the furrow, said assembly comprising:

a housing configured to receive and disperse seeds, said housing being configured to be attached to a bottom of the seeding apparatus, said housing including a seed wing and a sealer plate attached together, said seed wing defining an upper wall of said housing and said sealer plate defining a bottom wall;

said sealer plate having a top side, a bottom side, a front edge, a back edge, a first side edge and a second side edge;

said seed wing having an upper surface, a lower surface, forward edge, a rearward edge, a first lateral edge and a second lateral edge, said seed wing being configured to be abutted against and coupled to the seeding apparatus, said housing having a lumen therein being in fluid communication with a seed inlet tube of the seeding apparatus, said sealer plate being attached to said lower surface of said seed wing, said seed wing and said sealer plate forming a pair of ejection ports of said lumen at a juncture of said rearward edge and said back edge, said ejection ports being positioned rearward of a blade of the seeding apparatus;

said ejection ports being spaced from each other, each of said ejection ports being angled away from a dividing line extending through said forward and rearward edges to disperse seeds rearwardly and laterally away from said housing, said lumen being arcuate on each side of said dividing line and being arcuate from said dividing line to each of said ejection ports; and said sealer plate having a central area extending from said front edge to said back edge, said bottom side being angled downwardly from said central area to each of said first and second side edges.

10. The assembly according to claim 9, wherein said lumen is bounded by a rearward wall distal to said forward edge and a forward wall proximal to said forward edge, said forward wall being concavely arcuate adjacent to said ejection ports.

11. The assembly according to claim 9, wherein said lumen is formed by a channel extending upwardly into said lower surface of said seed wing.

12. The assembly according to claim 11, wherein said seed wing is comprised of a plastic material.

13. The assembly according to claim 11, wherein said seed wing and said sealer plate are each frustum shaped such that said first and second lateral edges of said seed wing are angled away from each other from said forward edge to said rearward edge and said first and second side edges are angled away from each other from said front edge to said back edge.

14. The assembly according to claim 9, further including a splitting insert being mounted between said sealer plate and said seed wing, said splitting insert being positioned between said ejection ports and dividing seeds from the seed inlet tube between said pair of ejection ports.

15. The assembly according to claim 13, wherein said sealer plate has a central area extending from said front edge to said back edge, said bottom side being angled downwardly from said central area to each of said first and second side edges.

16. The assembly according to claim 12, wherein said seed wing has a middle section extending from said forward edge to said rearward edge, said upper surface being angled downwardly from said middle section to each of said first and second lateral edges.

17. The assembly according to claim 9, wherein said upper surface is angled upwardly from said forward edge to said rearward edge.

* * * * *